(12) United States Patent
Tanaka et al.

(10) Patent No.: US 7,852,343 B2
(45) Date of Patent: Dec. 14, 2010

(54) BURST MEMORY ACCESS METHOD TO RECTANGULAR AREA

(75) Inventors: Takaharu Tanaka, Osaka (JP); Tetsuji Mochida, Osaka (JP); Nobuyuki Ichiguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 259 days.

(21) Appl. No.: 10/599,832

(22) PCT Filed: Mar. 18, 2005

(86) PCT No.: PCT/JP2005/004966

§ 371 (c)(1),
(2), (4) Date: Oct. 11, 2006

(87) PCT Pub. No.: WO2005/109205

PCT Pub. Date: Nov. 17, 2005

(65) Prior Publication Data

US 2007/0208919 A1    Sep. 6, 2007

(30) Foreign Application Priority Data

Apr. 15, 2004    (JP) .......................... 2004/120740

(51) Int. Cl.
   *G09G 5/39*    (2006.01)
(52) U.S. Cl. .................. 345/531; 345/474; 345/533; 365/233.18; 710/35; 348/208.4; 375/240.16
(58) Field of Classification Search .............. 382/233, 382/250; 712/225
   See application file for complete search history.

(56) References Cited

U.S. PATENT DOCUMENTS 5,239,512 A    8/1993    Fautier et al.
5,850,483 A *  12/1998   Takabatake et al. ......... 382/233
6,075,889 A     6/2000   Hamilton, Jr. et al.
6,075,899 A *   6/2000   Yoshioka et al. ............ 382/233

(Continued)

FOREIGN PATENT DOCUMENTS

EP    0859524    8/1998

(Continued)

OTHER PUBLICATIONS

English Language Abstract of JP 2000-348168.

(Continued)

*Primary Examiner*—Xiao M Wu
*Assistant Examiner*—Phi Hoang
(74) *Attorney, Agent, or Firm*—Greenblum & Bernstein P.L.C.

(57) ABSTRACT

The information processing device in the present invention includes a memory 1 which is a DRAM featuring a burst mode, and burst-transfers data at successive column addresses, masters (13), (14), and (15) which issue access requests, and a command processing unit (11) which converts an access address that is included in the access request issued from each master. One or more of the masters access an M×N rectangular area where M and N are integers, and the command processing unit (11) converts access addresses so that a column address of data at the (K+m)th column, where K and m are integers and $m \leq M$, of an Lth line, and a column address of data at a Kth column of an (L+n)th line, where L and n are integers and $n \leq N$, become successive.

14 Claims, 10 Drawing Sheets

U.S. PATENT DOCUMENTS

| | | | |
|---|---|---|---|
| 6,205,181 B1 * | 3/2001 | Hu et al. | 375/240.26 |
| 6,212,231 B1 * | 4/2001 | Takano | 375/240.24 |
| 6,353,438 B1 | 3/2002 | Van Hook et al. | |
| 6,745,320 B1 * | 6/2004 | Mitsuishi | 712/225 |
| 6,750,909 B1 * | 6/2004 | Tsai | 348/231.2 |
| 6,791,625 B1 | 9/2004 | Kohashi et al. | |
| 6,807,311 B1 * | 10/2004 | Callway et al. | 382/250 |
| 6,819,326 B2 | 11/2004 | Jaspers | |
| 7,110,663 B1 | 9/2006 | Tsukagoshi et al. | |
| 2002/0196260 A1 * | 12/2002 | Candler et al. | 345/531 |
| 2003/0113026 A1 * | 6/2003 | Srinivasan et al. | 382/239 |
| 2003/0151609 A1 * | 8/2003 | Champion | 345/571 |
| 2004/0258399 A1 * | 12/2004 | Ishii et al. | 386/112 |
| 2005/0013368 A1 * | 1/2005 | Gallant et al. | 375/240.16 |
| 2006/0263069 A1 | 11/2006 | Tsukagoshi et al. | |

FOREIGN PATENT DOCUMENTS

| | | |
|---|---|---|
| EP | 1089567 | 4/2001 |
| GB | 2289199 | 11/1995 |
| JP | 7-220059 | 8/1994 |
| JP | 10-191236 | 7/1998 |
| JP | 2000-175201 | 6/2000 |
| JP | 2000-348168 | 12/2000 |
| JP | 2004/518343 | 6/2004 |
| WO | 98/09444 | 3/1998 |
| WO | 00/36841 | 6/2000 |
| WO | 00/62550 | 10/2000 |
| WO | 02/056600 | 7/2002 |

OTHER PUBLICATIONS

English Language Abstract of JP 7-220059.
English Language Abstract of JP 10-191236.
English Language Abstract of JP 2000-175201.

* cited by examiner

| 0 | 1 | 64 | 65 | 128 | 129 | 192 | 193 | 256 | 257 | 320 | 321 | 384 | 385 | 448 | 449 |
|---|---|---|---|---|---|---|---|---|---|---|---|---|---|---|---|
| 32 | 33 | 96 | 97 | 160 | 161 | 224 | 225 | 288 | 289 | 352 | 353 | 416 | 417 | 480 | 481 |
| 2 | 3 | 66 | 67 | 130 | 131 | 194 | 195 | 258 | 259 | 322 | 323 | 386 | 387 | 450 | 451 |
| 34 | 35 | 98 | 99 | 162 | 163 | 226 | 227 | 290 | 291 | 354 | 355 | 418 | 419 | 482 | 483 |
| 4 | 5 | 68 | 69 | 132 | 133 | 196 | 197 | 260 | 261 | 324 | 325 | 388 | 389 | 452 | 453 |
| 36 | 37 | 100 | 101 | 164 | 165 | 228 | 229 | 292 | 293 | 356 | 357 | 420 | 421 | 484 | 485 |
| 6 | 7 | 70 | 71 | 134 | 135 | 198 | 199 | 262 | 263 | 326 | 327 | 390 | 391 | 454 | 455 |
| 38 | 39 | 102 | 103 | 166 | 167 | 230 | 231 | 294 | 295 | 358 | 359 | 422 | 423 | 486 | 487 |

(b)

| ① 0 | 1 | ③ 64 | 65 | ⑤ 128 | 129 | ⑦ 192 | 193 | ⑨ 256 | 257 | ⑪ 320 | 321 | ⑬ 384 | 385 | ⑮ 448 | 449 |
|---|---|---|---|---|---|---|---|---|---|---|---|---|---|---|---|
| ② 32 | 33 | ④ 96 | 97 | ⑥ 160 | 161 | ⑧ 224 | 225 | ⑩ 288 | 289 | ⑫ 352 | 353 | ⑭ 416 | 417 | ⑯ 480 | 481 |
| 2 | 3 | 66 | 67 | 130 | 131 | 194 | 195 | 258 | 259 | 322 | 323 | 386 | 387 | 450 | 451 |
| 34 | 35 | 98 | 99 | 162 | 163 | 226 | 227 | 290 | 291 | 354 | 355 | 418 | 419 | 482 | 483 |
| 4 | 5 | 68 | 69 | 132 | 133 | 196 | 197 | 260 | 261 | 324 | 325 | 388 | 389 | 452 | 453 |
| 36 | 37 | 100 | 101 | 164 | 165 | 228 | 229 | 292 | 293 | 356 | 357 | 420 | 421 | 484 | 485 |
| 6 | 7 | 70 | 71 | 134 | 135 | 198 | 199 | 262 | 263 | 326 | 327 | 390 | 391 | 454 | 455 |
| 38 | 39 | 102 | 103 | 166 | 167 | 230 | 231 | 294 | 295 | 358 | 359 | 422 | 423 | 486 | 487 |

(c)

| 0 | 1 | 64 | 65 | 128 | 129 | 192 | 193 | 256 | 257 | 320 | 321 | 384 | 385 | 448 | 449 |
|---|---|---|---|---|---|---|---|---|---|---|---|---|---|---|---|
| 32 | 33 | 96 | 97 | 160 | 161 | 224 | 225 | 288 | 289 | 352 | 353 | 416 | 417 | 480 | 481 |
| 2 | 3 | 66 | 67 | 130 | 131 | 194 | 195 | 258 | 259 | 322 | 323 | 386 | 387 | 450 | 451 |
| 34 | 35 | 98 | 99 | 162 | 163 | 226 | 227 | 290 | 291 | 354 | 355 | 418 | 419 | 482 | 483 |
| 4 | 5 | 68 | 69 | 132 | 133 | 196 | 197 | 260 | 261 | 324 | 325 | 388 | 389 | 452 | 453 |
| 36 | 37 | 100 | 101 | 164 | 165 | 228 | 229 | 292 | 293 | 356 | 357 | 420 | 421 | 484 | 485 |
| 6 | 7 | 70 | 71 | 134 | 135 | 198 | 199 | 262 | 263 | 326 | 327 | 390 | 391 | 454 | 455 |
| 38 | 39 | 102 | 103 | 166 | 167 | 230 | 231 | 294 | 295 | 358 | 359 | 422 | 423 | 486 | 487 |

BURST MEMORY ACCESS METHOD TO RECTANGULAR AREA

TECHNICAL FIELD

The present invention relates to an information processing device and a data access method which read out a rectangular area inside of image data from a DRAM, the DRAM having a burst-mode which burst-transfers data of successive column addresses; the data access method processes the rectangular area of image data.

BACKGROUND ART

In recent years, multiple functions are being implemented in system LSIs; from the standpoint of system cost reduction, architecture such as unified memory, such as DRAM, are often used. It has also become common for diverse DRAM access requests to be made to a single DRAM.

In addition, since system LSIs implemented with multiple functions, such as media processing, demand a high bandwidth, speed enhancement in DRAM is becoming increasingly necessary. Accordingly, memory manufacturers are competing fiercely in DRAM speed enhancement.

However, since the operation frequency of a DRAM memory cell itself has not changed from before, the minimum access size to DRAM is rapidly increasing from the perspective of system LSI. As a result, there are no problems transferring long data that is equivalent to a burst length, however there is the problem that when transmitting short data, the transference load of unnecessary data increases and the effective bandwidth will decrease. For example, there is the problem that, for media processing, the effective bandwidth for a motion compensation process necessary for video decoding will drop; this problem has conventionally been avoided by utilizing high cost DRAM, which tolerates this drop in effective bandwidth.

For increasing the effective bandwidth, the image processing device disclosed in Patent Document 1, for example, aims to improve effective bandwidth by including a cache memory for caching single slice data from a frame memory for storing frame data.

[Patent Document 1] Japanese Laid-Open Patent Application No. 2000-175201 Publication

DISCLOSURE OF INVENTION

Problems that Invention is to Solve

Since in the past, access to reference images in motion compensation processing has been access on a line basis, in contrast to a rectangular area basis i.e. short data-length lateral access, there is the problem that the transfer load of unnecessary data increases and the effective bandwidth drops. In other words, since the minimal access size for DRAM is rapidly increasing, as mentioned above, when data shorter than the burst length on the line direction is transferred, there is the problem that the transfer load of unnecessary data increases, and that the effective bandwidth drops.

In the conventional address mapping between a physical address of the DRAM and a logical address of image data, in order to earn a burst length for the line access direction, mapping is performed so that the column addresses are successive with the line direction. As a result, in access to data that is shorter than the burst length on the line direction, such as motion compensation processing, there is the problem that the transfer load of unnecessary data increases and the effective bandwidth drops.

Further, even when using a cache memory which caches data on a slice basis, there is the problem that the effective bandwidth cannot be raised for access to rectangular areas which exceed a boundary of a slice, as in motion compensation processing.

The present invention is conceived to solve the aforementioned problems and has as an object to provide an information processing device and data access method which reduce the transfer load of unnecessary data and improve effective bandwidth, even when data is accessed on a rectangular area basis, as in motion compensation processing.

Means to Solve the Problems

In order to achieve the above object, the information processing device in the present invention includes a DRAM having a burst mode which burst-transfers data at successive column addresses; one or more data processing units which issue an access request; and an address conversion unit which converts access addresses which are included in the access request issued from the one or more data processing units. At least one of the one or more data processing units accesses an M×N rectangular area, where M and N are integers, and the address conversion unit converts access addresses so that a column address of data at the (K+m)th column, where K and m are integers and $m \leq M$, of an Lth line, and a column address of data at a Kth column of an (L+n)th line, where L and n are integers and $n \leq N$, become successive.

According to this configuration, there is the effect that the invalid transfer load can be reduced and the effective bandwidth can be improved in a short burst-length access method like rectangular access.

Here, some or all areas of the DRAM is a frame memory which stores image data, the rectangular area is N pixels×N lines in the image data, where M and N are integers, and the data processing unit may have a structure that performs one of motion compensation and motion estimation.

Here, n may be equal to 2n' (n=2n').

According to this configuration, there is the effect that unnecessary transfer loads can be reduced and the effective bandwidth can be improved in field estimation access.

Here, another one of the data processing units may access the image data on a line basis, and may successively read out all data of 2n lines.

According to this configuration, there is the effect that invalid transfer loads can be reduced and the effective bandwidth can be improved in DRAM which is mapped more than the address conversion unit above.

Here, the data processing unit may decode an inputted stream on a basis of two or more macroblocks, by motion compensation, the DRAM may store the image data decoded by the data processing unit, the information processing device may further include: a memory featuring a smaller storage capacity and faster access speed than the DRAM; a data transfer unit which transfers data from the DRAM to the memory; and the data processing unit accesses the image data stored in the DRAM as reference data.

Here, the image data stored in the DRAM may be split into split regions larger in size than the rectangular area, and the data transfer unit may transfer data on a split region basis from the DRAM to the memory, based on the access request from the data processing unit.

Here, the data transfer unit may have a structure that includes a register which holds a size of the split region.

Since plural rectangular areas can be transferred simultaneously, there is the effect that invalid transfer loads can be reduced and the effective bandwidth can be improved.

The data transfer unit may transfer data from the DRAM to the memory when a predetermined number n of read-out requests are outputted from the data processing unit.

Here, the data transfer unit may have a structure that includes a register which holds the size of the split region and the number n.

The data transfer unit may transfer the split region which includes all rectangular areas, from the DRAM to the memory when the access request from the data processing unit requests the rectangular areas which are adjacent or overlapping.

The data processing unit includes: a motion vector estimation unit which estimates plural motion vectors according to plural macroblocks from the inputted stream; and a decoding unit which decodes the inputted stream on a macroblock basis, and stores the decoding result in the DRAM.

A decoding sequence of the macroblocks may be changed based on the plural motion vectors so that addresses for accessing the DRAM vectors become successive.

A data access method in the present invention is a data access method for accessing a rectangular area made up of M pixels×N lines in image data from a DRAM, the DRAM having a burst mode which burst-transfers data of continuous column addresses, and storing the image data, and has an input step of inputting an access request for the rectangular area; and an address changing step of changing an access addresses included in an access request issued in the access step. In the address converting step, addresses are converted so that a column address of data at the (K+m)th column, where K and m are integers and m≦M, of the Lth line, and a column address of the data at the Kth column of the (L+n) line, where L and n are integers and n≦N, become successive.

Effects of the Invention

As above and according to the information processing device and the data access method in the present invention, there is the effect that invalid transfer loads can be reduced and the effective bandwidth improved in comparison to data access which is shorter than the burst length of a rectangular area.

BRIEF DESCRIPTION OF DRAWINGS

FIG. 7 (a) is a diagram which shows an example of mapping for access on a rectangular area basis, FIG. 7 (b) is a diagram which shows an example of an access sequence for a master which requests memory access on a line basis, and FIG. 7 (c) is a diagram which shows an access sequence for a master which requests memory access on a line basis.

NUMERICAL REFERENCES

1, 3 Memory
2, 2a Information processing device
4 Data transfer unit
10 Memory interface
11 Command processing unit
12 Data processing unit
13 to 15 Memory access request masters
20 Command bus
21 Data bus
100 Address conversion unit
201 Decoding device
202 Motion vector estimation unit
203 Decoding unit

BEST MODE FOR CARRYING OUT THE INVENTION

Below, an information processing device according to the embodiments of the present invention is described in detail based on diagrams.

First Embodiment

Figure 1:
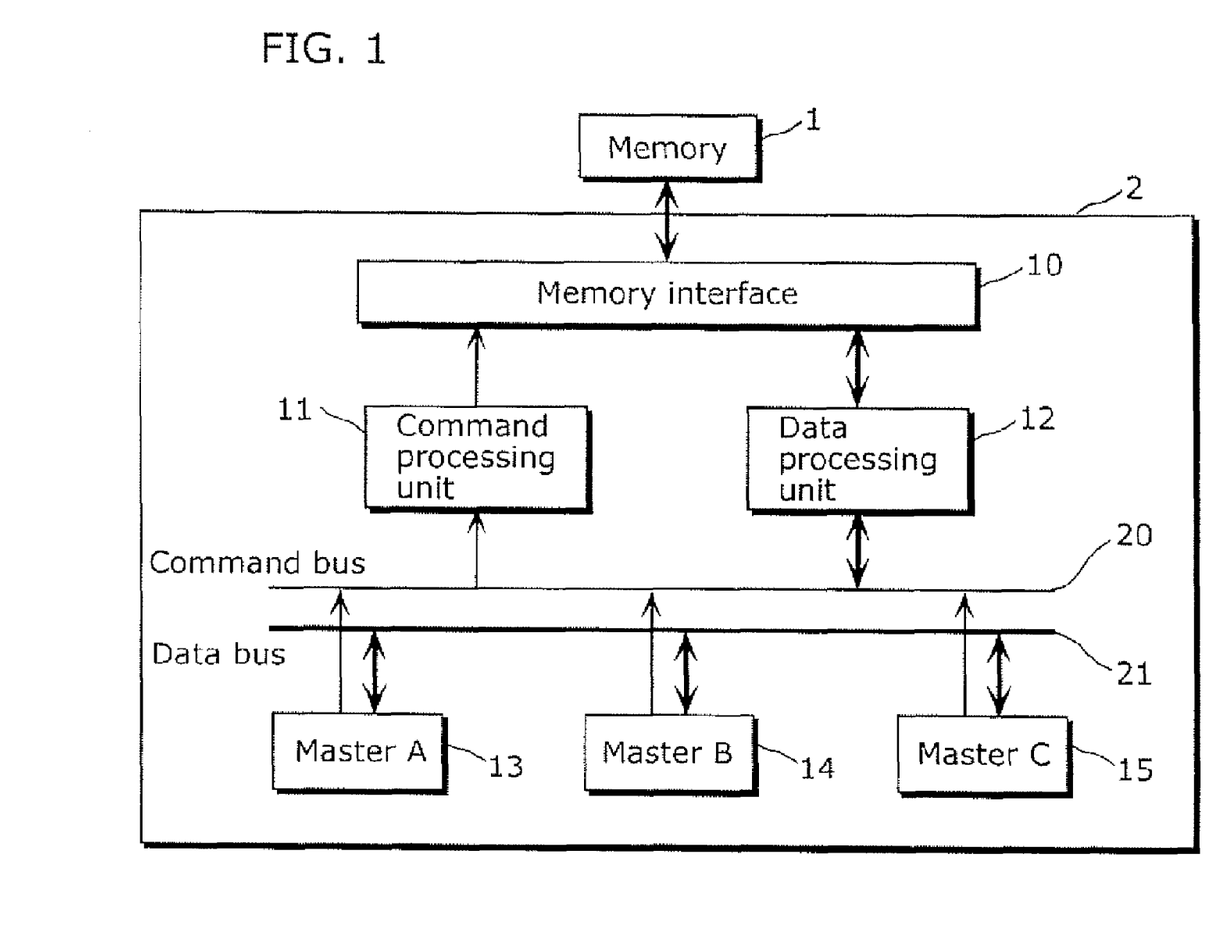
FIG. 1 is a structural diagram of an information processing device according to the first embodiment of the present invention.

FIG. 1 is a block diagram which shows the structure of an information processing device in the first embodiment of the present invention. The information processing device 2 includes a memory interface 10 connected to an external memory 1, a command processing unit 11, a data processing unit 12 and masters 13, 14 and 15. For example, in the decoding processing for a stream, the master 13 accesses the memory 1 on a rectangular area basis and the master 14 accesses the memory 1 on a line basis in order to externally output the decoded image.

In the figure, the memory 1 is a DRAM which stores image data, having a burst mode for burst-transferring data stored in successive column addresses.

The plural masters 13, 14 and 15 are connected to a common command bus 20 and a common data bus 21, output a command as a memory access request to the command processing unit 11, and input and output data into and from the data processing unit 12. Commands from the plural masters 13, 14 and 15 are serialized in priority rank and sent to the memory 1 through the memory interface 10. For writing, write data is sent to the memory 1 in synchronization with the sending of the command through the memory interface 10. For read data, after a command is accepted in the memory 1 and an appropriate time has elapsed, the read data is returned to data processing unit 12 through the memory interface 10. Afterwards, the read data is returned to one of the masters 13, 14 and 15 through data bus 21.

Figure 2:
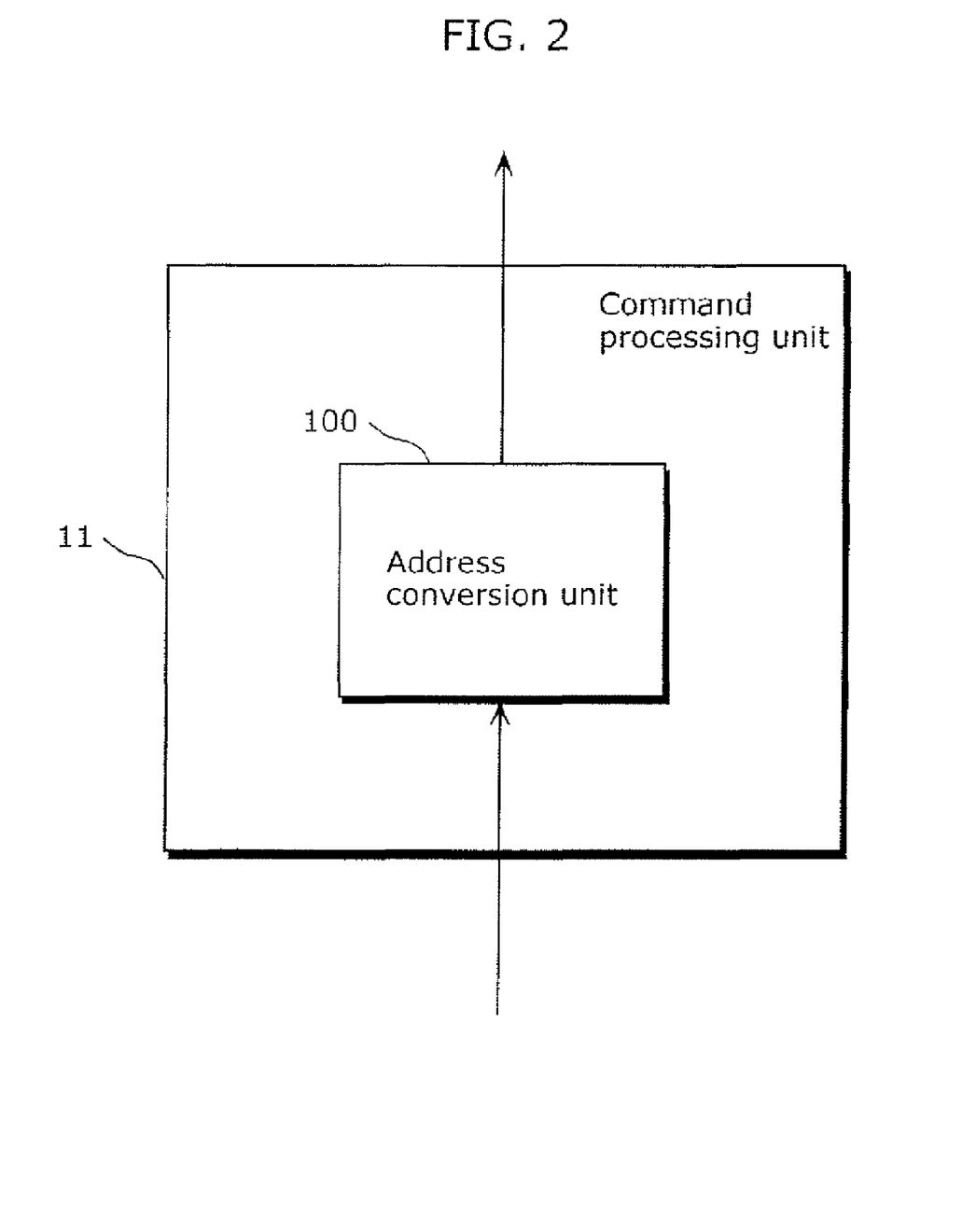
FIG. 2 is a structural diagram of a command processing unit.
Figure 3:
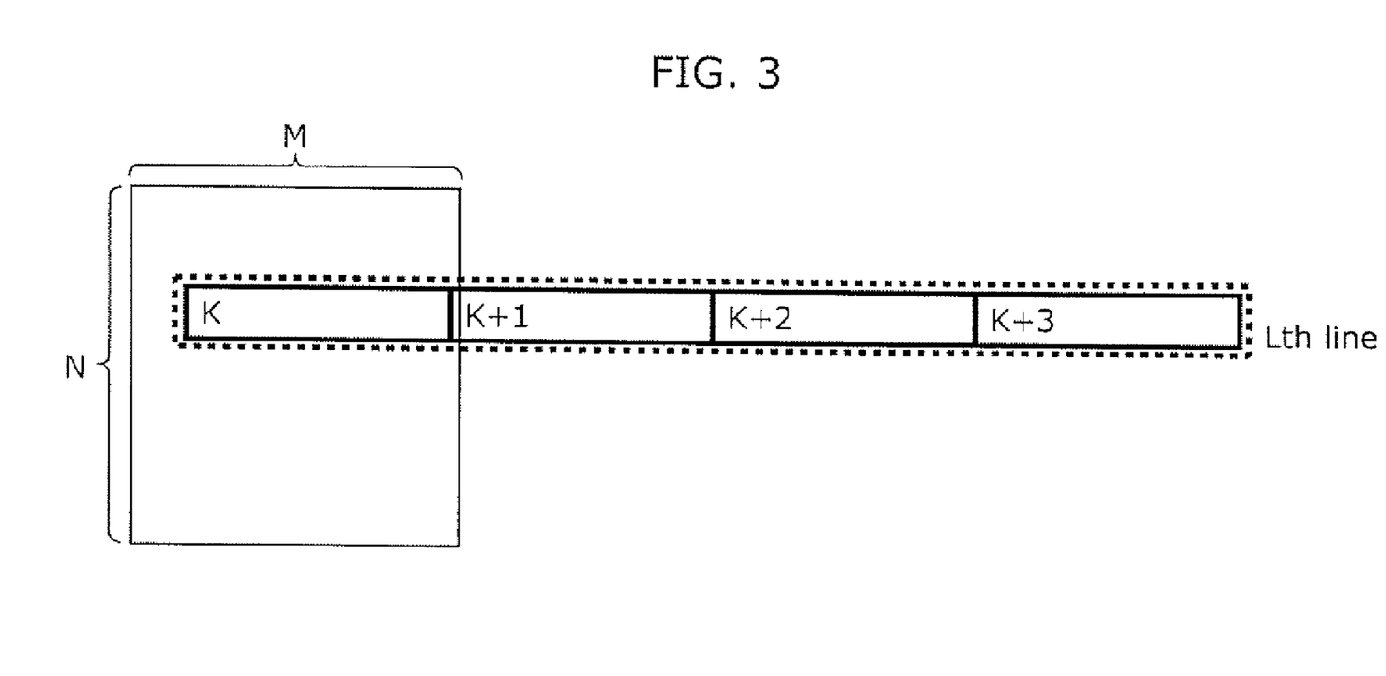
FIG. 3 is a diagram which shows an example of a mapping of conventional address conversion.
Figure 4:
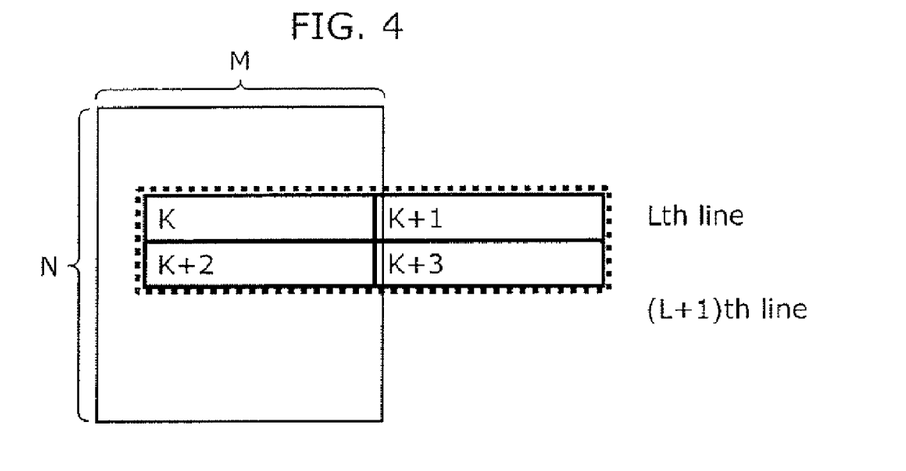
FIG. 4 is a diagram which shows an example of a mapping performed by an address conversion unit.
Figure 5:
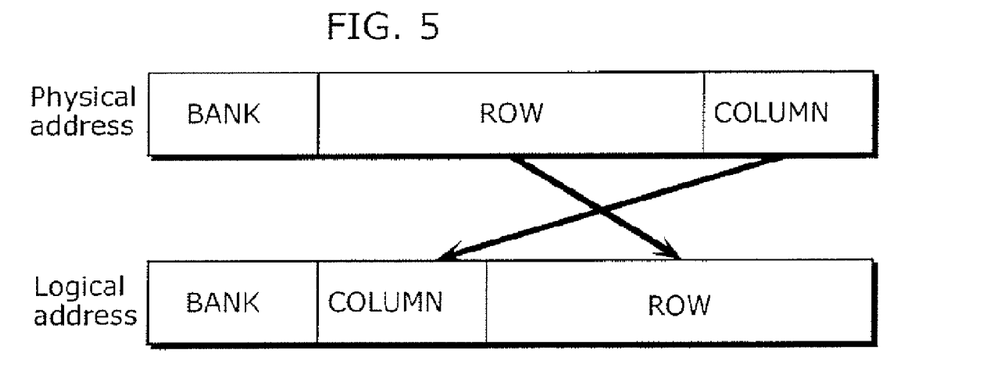
FIG. 5 is a diagram which shows an example of the address conversion performed by the address conversion unit.

The command processing unit 11 has an address conversion unit 100, as shown in FIG. 2, and a function for converting a logical address to a physical address. Specifically, the address conversion unit 100 converts addresses so that, in the case where a rectangular area of M pixels×N lines (M and N are integers) in the image data is accessed, the column address of data in a (K+m)th line (K and m are integers and m≦M) of an Lth (L is an integer) line and the column address of data at the Kth column of a (L+n)th line (L and n are integers and n≦N) become successive. FIG. 3 is an example of the mapping performed in conventional address conversion; in the case where the minimal access size of the DRAM is 4 bursts, data at one part of a (K+1)th column and all data at (K+2)th and (K+3)th columns become invalid data and the effective bandwidth drops. On the other hand, FIG. 4 is an example of mapping performed in the address conversion unit 100, when m=1 and n=1. By making the column address of data in the (K+1)th column address and the column address of data in the (K+2)th column address successive, only a part of data in the (K+1)th column and a part of data in the (K+2)th column are wastefully transferred. In FIG. 5, an example of the logical and physical address conversion in the address conversion unit 100 is shown.

Figure 6:
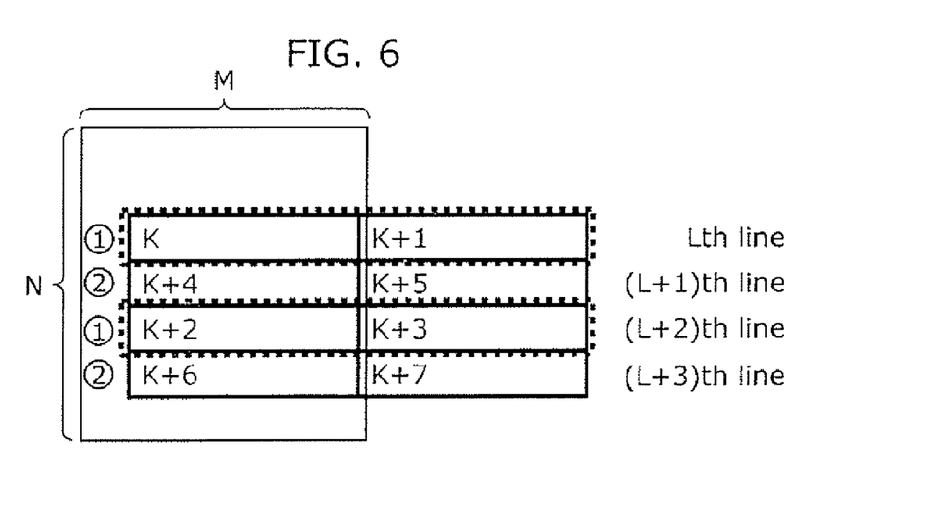
FIG. 6 is a diagram which shows an example of the mapping performed by the address conversion unit.

FIG. 6 is an example of the mapping of the address conversion unit 100 when m=1 and n=2.

In FIG. 6, the addresses are successive in the sequence: Lth line, (L+2)th line, (L+1)th line, (L+3)th line. When the minimum access size of the DRAM is 4 bursts, in the first access, the Lth line and (L+2)th line are accessed, and in the second access, the (L+1)th line and the (L+3)th line are accessed. For example in motion compensation processing, when the field is estimated, the access is performed by skipping a line of the reference image. Once mapping is performed as in FIG. 6, when field estimation is performed in motion compensation processing, the invalid transfer load is reduced and it becomes possible to improve the effective bandwidth. Also, when the frame is estimated, access to the lines circled 1 and circled 2 as in FIG. 6 may be repeated with no problems.

Figure 7:
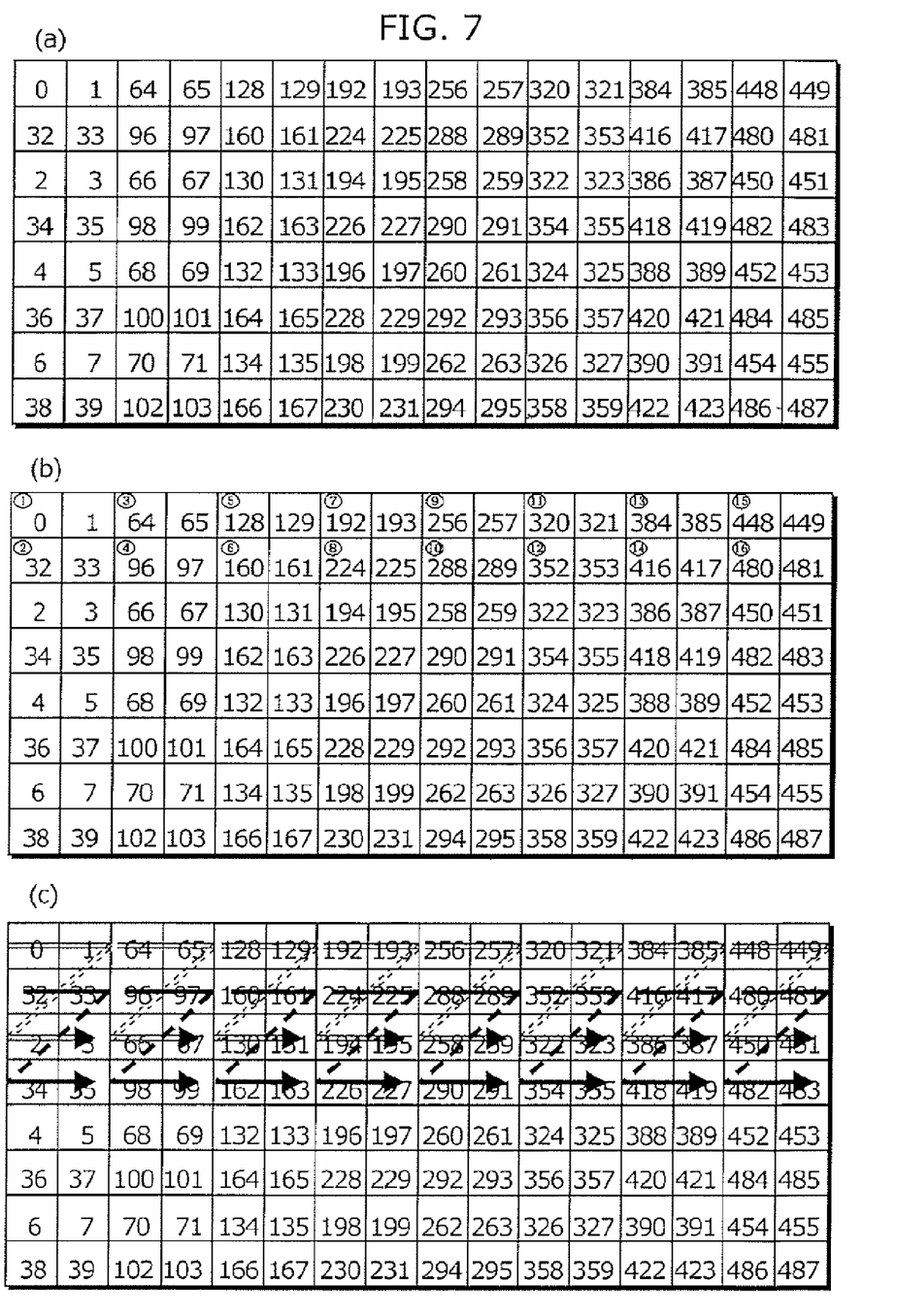

FIG. 7 is a diagram which shows the access sequence according to a master (for example the master 14), which accesses memory on a line basis. In the case where a mapping such as the one above (see FIG. 7 (*a*)) is performed, a master which accesses memory on a rectangular area basis and a master which accesses memory on a line basis, both of which access the same area on the DRAM, share the memory.

Although the master 14 intends to access, for example, the sequence of the circled numbers 1, 3, . . . , 15, 2, 4, 6, . . . , 16 (see FIG. 7 (*b*)) on a line basis, the master 14 may accidentally take the data of another, invalid line. In contrast, in the present embodiment, after the command processing unit 11 and data processing unit 12 access all four lines (see FIG. 7 (*c*)), and once the processing of the master, which makes the line memory access request, has started, the above-mentioned inconvenience is resolved. For example, since four lines must be taken simultaneously when filter processing is performed on a decoded result and the filter process is performed using a 4-tap filter, the invalid transfer load can be reduced and the effective bandwidth can be improved when an access method such as the one above is employed.

Second Embodiment

Figure 8:
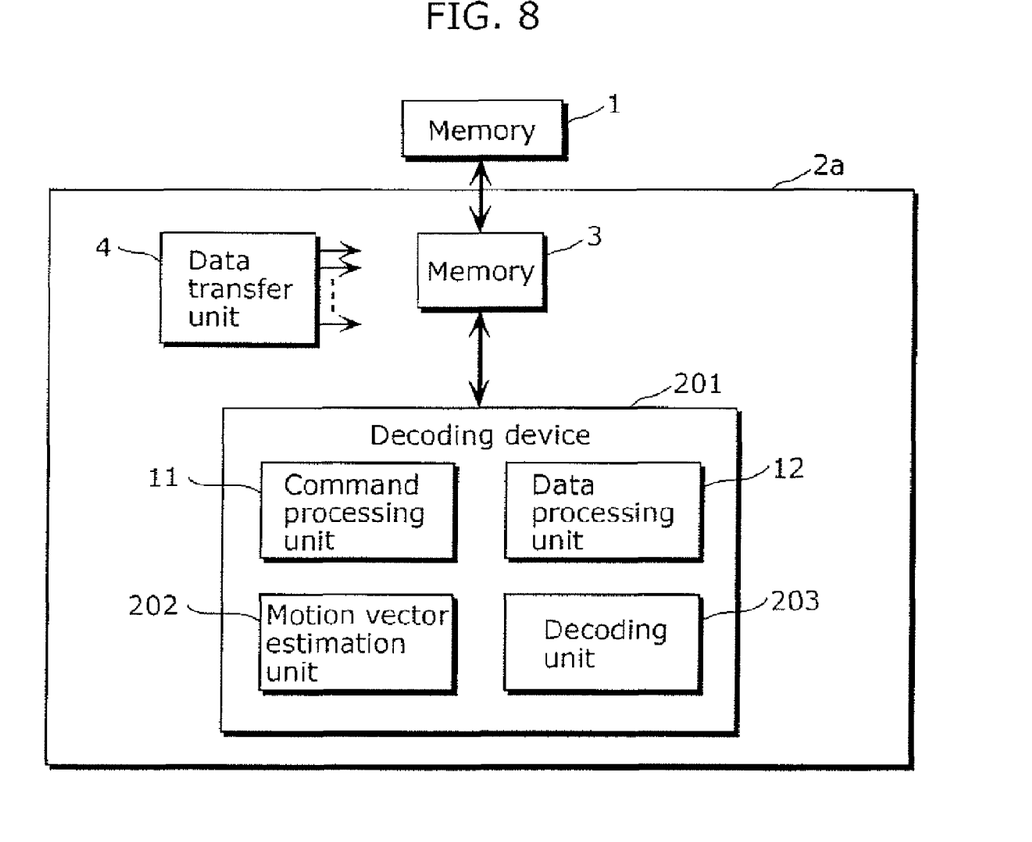
FIG. 8 is a structural diagram of the information processing device according to the second embodiment of the present invention.

FIG. 8 is a block diagram which shows the structure of an information processing device in the second embodiment of the present invention. The information processing device 2*a* includes a memory 3 and a decoding device 201. The decoding device 201 includes the command processing unit 11 above, data processing unit 12 above, a motion vector estimation unit 202 which estimates plural motion vectors corresponding to plural macroblocks from a stream inputted from outside, and a decoding unit 203 which decodes the inputted stream on a macroblock basis and stores the decoded result in the memory 1.

Figure 9:
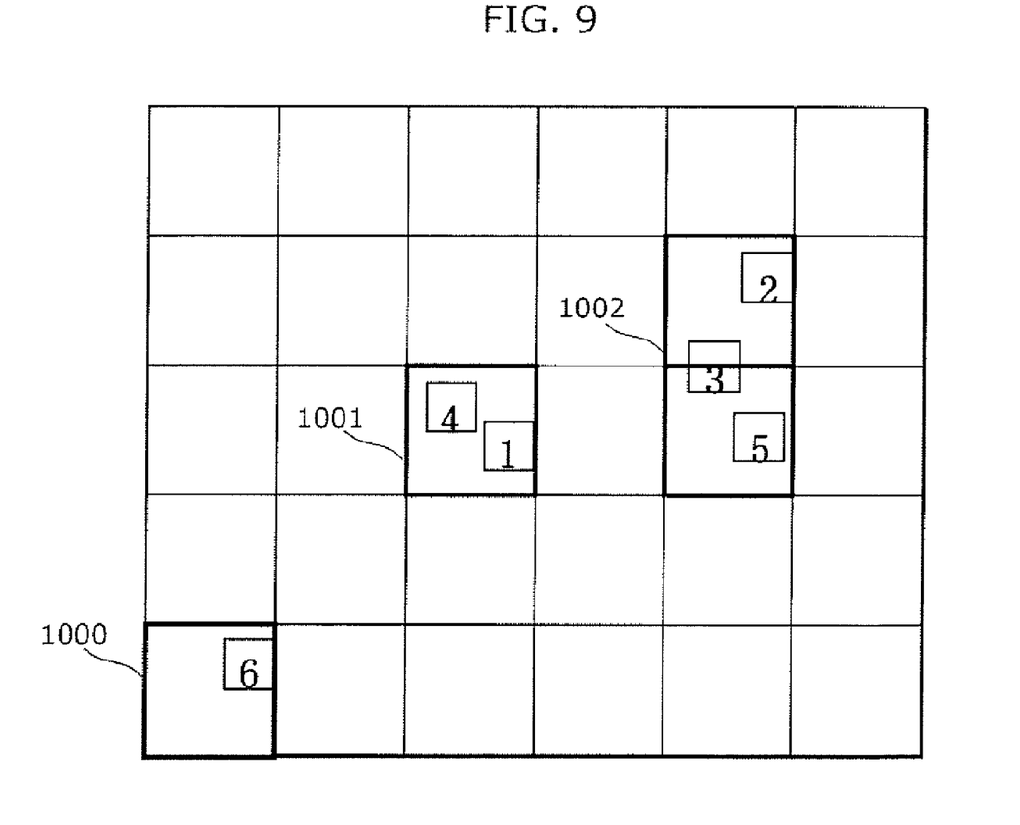
FIG. 9 is a diagram which shows an example of data areas transferred by a data transfer unit.

The decoding device 201 can transfer data from either the memory 1 or the memory 3. The capacity of the memory 3 is smaller than that of the memory 1. For example, the memory 1 is a DRAM and the memory 3 is a faster SRAM. The decoding unit 203 decodes the stream by the motion compensation process. In the motion compensation process, the decoding unit 203 must take the decoded image data already in the memory 1 as a reference image and read out a rectangular area from the reference image. When so this processing is performed, a data transfer unit 4 transfers the necessary data among the reference images stored in the memory 1 to the memory 3, not on a rectangular area basis but on a split region basis. FIG. 9 is a diagram which shows an example of a split region transferred by data transfer unit 4. In the figure, for the sake of convenience, the area is split into 6×6 split regions. The example in FIG. 9 is an example which shows the reference image, which each macroblock references, at the point when the processing of 6 macroblocks has finished. Since the reference image was taken on a macroblock basis in prior art, each rectangular area on which a number is written is transferred one by one. In the present embodiment processing is performed on a basis of a number of macroblocks, and in the case where more than one reference image is referenced for a split region which has been split in advance into a size larger than the rectangular areas but smaller than the memory 3, the data transfer unit 4 transfers the split region. For example, split regions shown in FIG. 9 such as 1000, 1001 and 1002 are transferred. For 1002, when the area split in advance is less than half of the capacity of the memory 3, two rectangles may be transferred simultaneously. Also, a data transfer sequence for 1000, 1001 and 1002 is not of concern. Note that the split size, which is decided in advance, may be made alterable in a register. This register may be changed dynamically. Since it becomes possible to take a large rectangular area once, the invalid transfer area may be reduced and it becomes possible to improve the effective bandwidth.

Figure 10:
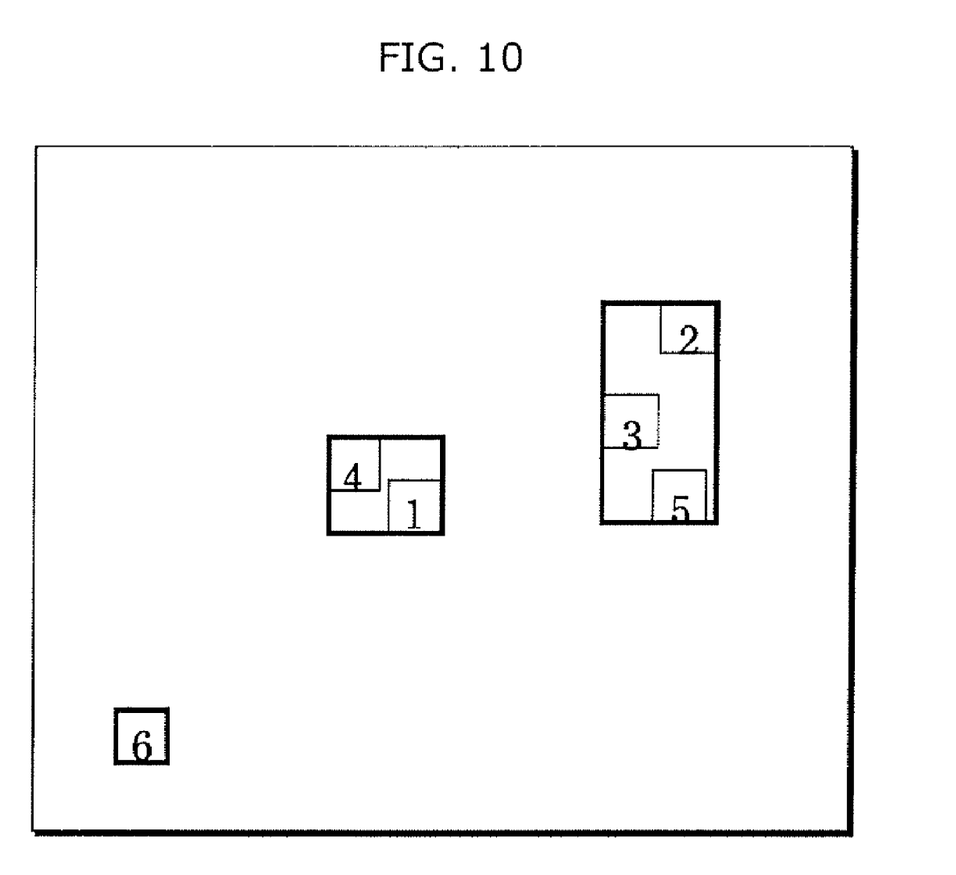
FIG. 10 is a diagram which shows an example of a so transfer area of the data transfer unit.

FIG. 10 is a diagram which shows an example of another transfer area in data transfer unit 4. The data transfer unit 4 performs data transmission when the predetermined number of areas are referred to within a range below the capacity of the memory 3. Note that the information processing device may be set so that the number of areas which are decided in advance may be so alterable by the register setting within data transfer unit 4. The register may be changed dynamically. Since the split region, which is larger than the rectangle areas in one transfer, is transferred, the invalid transfer area is reduced by multiple transfers and it becomes possible to improve the effective bandwidth.

Figure 11:
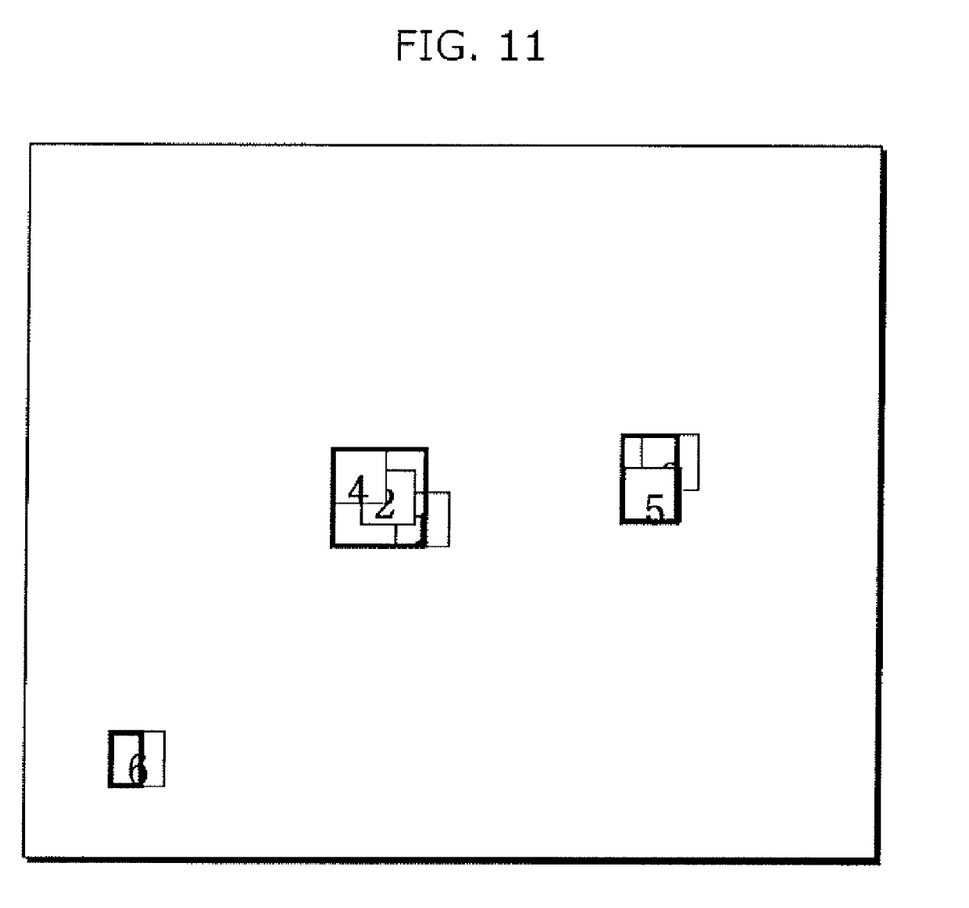
FIG. 11 is a diagram which shows an example of the transfer area for the data transfer unit.

FIG. 11 is a diagram which shows still another transfer area example for data transfer unit 4. Data transfer unit 4 transfers plural reference images simultaneously, only when the reference image addresses are successive or where the reference images overlap in the range below the capacity of the memory 3. Since it becomes possible to take a large rectangular area once, the invalid transfer area can be reduced and it becomes possible to improve the effective bandwidth.

Figure 12:
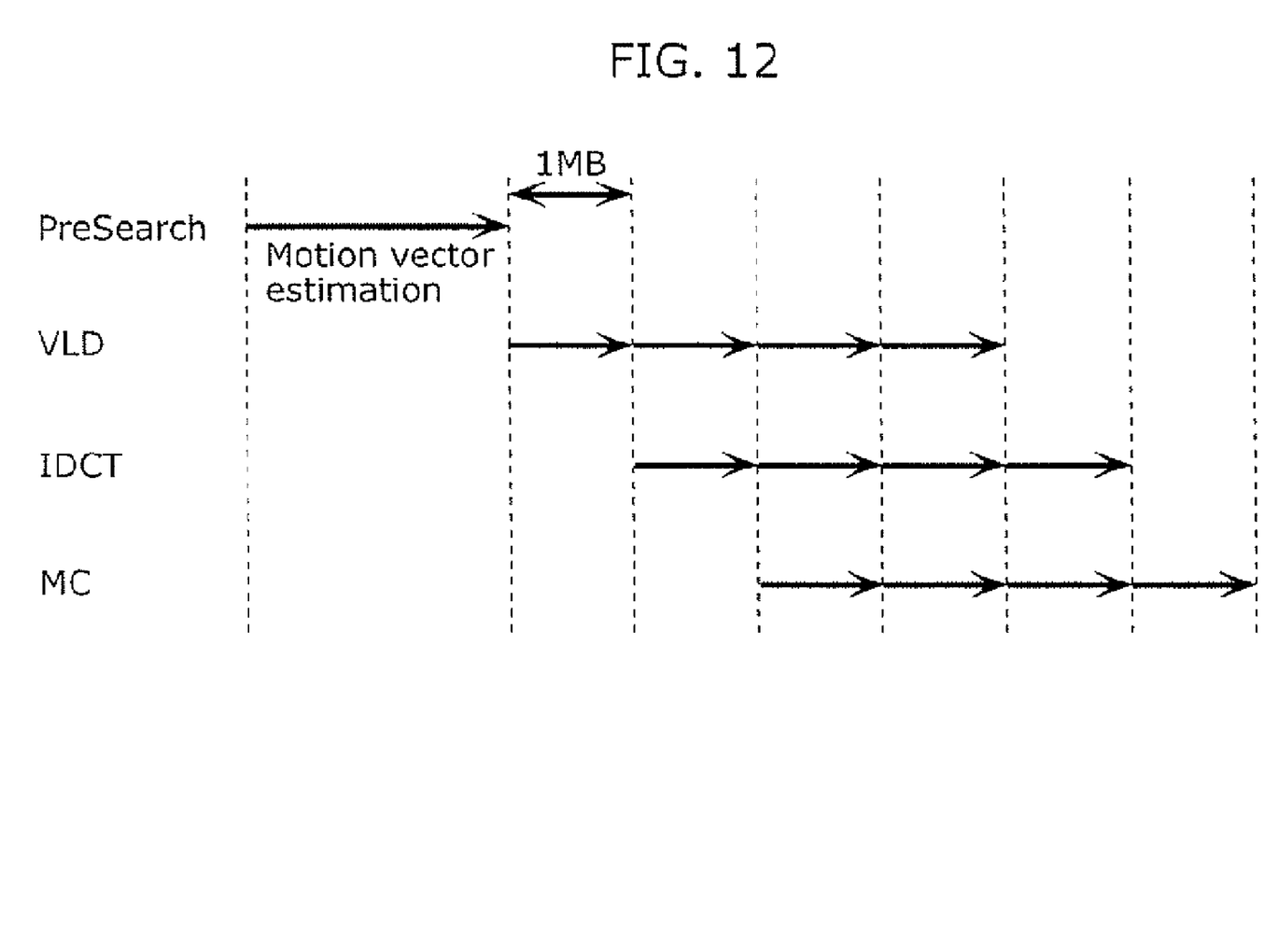
FIG. 12 is a diagram which shows a timing chart for a decoding device.

FIG. 12 is a diagram which shows a timing chart of the decoding device 201. As pictured, there are roughly four processes in the decoding process. Among these processes, the motion vector estimation unit 202 analyzes the input stream as a PreSearch process and performs a process in advance to estimate plural motion vectors in the plural macroblocks. In the PreSearch process, after estimating the motion vectors in plural macroblocks, the decoding unit 203 changes the decoding order for the macroblock so that the addresses of the rectangle areas which must be referenced become successive, based on the value of the motion vectors estimated; next, the VLD (Variable-length Decoding), the IDCT (Inverse Discreet Cosine Transformation) and the MC (Motion Compensation) processes are performed in pipelines. In this case, the motion compensation process takes reference images out of the memory in the sequence in which the macroblocks arrive, and since the order of the macroblocks is transposed in advance so that the addresses of the reference images become successive, and plural rectangular areas come to be included in one transfer of the split regions, the invalid transfer area can be reduced and it becomes possible to improve the effective bandwidth.

INDUSTRIAL APPLICABILITY

The present invention is applicable to an information processing device which includes a DRAM that stores image data and has a burst mode, which burst-transfers successive data at successive column addresses, and applies to an information processing device, for example a network terminal which reproduces a compression-encoded stream, a digital camera, a cellular telephone with camera, a DVD recorder/player, a PDA, a personal computer and so on which are capable of recording and playing back DTV (digital television) movies.

The invention claimed is:

1. An information processing device, comprising:
a DRAM having a burst mode which burst-transfers data of successive column addresses;
at least one data processor operable to issue an access request; and
an address converter operable to convert access addresses which are included in the access request issued from said at least one data processor,
wherein at least one of said at least one data processor is operable to access an M×N rectangular area, where M and N are positive integers,
said address converter is operable to convert access addresses so that a column address of data at a (K+m)th column of an Lth line and a column address of data at a Kth column of an (L+n)th line become successive, where K, m, L, and n are positive integers, m≦M, and n≦N, and
at least one rectangular area of said DRAM is a frame memory which stores image data, the at least one rectangular area is M pixels×N lines in the image data, and said at least one data processor is operable to perform one of motion compensation and motion estimation, where n=2n' and n' is a positive integer,
wherein the DRAM burst-transfers the data at the (K+m)th column of the Lth line and the data at the Kth column of the (L+n)th line in the burst mode by successively accessing the column address of the data at the (K+m)th column of the Lth line and the column address of the data at the Kth column of the (L+n)th line.

2. The information processing device according to claim 1, wherein another data processor is operable to access the image data on a line basis, and to continuously read out data of all 2n lines.

3. The information processing device according to claim 1, wherein said at least one data processor is operable to decode an inputted stream on a basis of at least two macroblocks, by motion compensation,
said DRAM is operable to store the image data decoded by said at least one data processor,
said information processing device further comprises:
a memory featuring a smaller storage capacity and a faster access speed than said DRAM;
a data transferor operable to transfer the data from said DRAM to said memory, and
said at least one data processor is operable to access the image data stored in said DRAM as reference data.

4. The information processing device according to claim 3, wherein the image data stored in said DRAM is split into transfer regions larger in size than the at least one rectangular area, and
said data transferor is operable to transfer data on a transfer region basis from said DRAM to said memory, based on the access request from said at least one data processor.

5. The information processing device according to claim 4, wherein said data transferor includes a register which holds a size of the transfer region.

6. The information processing device according to claim 4, wherein said data transferor is operable to transfer the data from said DRAM to said memory when a predetermined number n1 of access requests are outputted from said at least one data processor.

7. The information processing device according to claim 6, wherein said data transferor includes a register which holds the size of the transfer region and the predetermined number n1.

8. The information processing device according to claim 4, wherein said data transferor is operable to transfer the transfer region which includes all rectangular areas, from said DRAM to said memory when access requests from said at least one data processor request the rectangular areas which are adjacent or overlapping.

9. The information processing device according to claim 4, wherein said at least one data processor includes:
a motion vector estimator operable to estimate plural motion vectors corresponding to plural macroblocks from an inputted stream; and
a decoder operable to decode the inputted stream on a macroblock basis, and to store a decoding result into said DRAM,
wherein a decoding sequence of the plural macroblocks is changed based on the plural motion vectors so that addresses for accessing said DRAM become successive.

10. The information processing device according to claim 3,
wherein said data transferor is operable to transfer a minimum area which surrounds plural rectangular areas as a transfer region as data from said DRAM to said memory, based on the access request from said at least one data processor.

11. The information processing device according to claim 10,
wherein said data transferor is operable to transfer the data from said DRAM to said memory when a predetermined number n1 of access requests are outputted from said data processor.

12. The information processing device according to claim 11,
wherein said data transferor includes a register which holds a size of the transfer region and the predetermined number n1.

13. The information processing device according to claim 10,
wherein said data transferor is operable to transfer the transfer region which includes all rectangular areas, from said DRAM to said memory when access requests from said at least one data processor request the rectangular areas which are adjacent or overlapping.

14. A data access method for accessing a rectangular area made up of M pixels×N lines in image data from a DRAM, the DRAM having a burst mode which burst-transfers data of continuous column addresses, and storing the image data, the data access method comprising:

inputting an access request for the rectangular area;

converting access addresses included in the access request so that a column address of data at a (K+m)th column of an Lth line and a column address of the data at a Kth column of an (L+n)th line become successive, where K, m, L, and n are positive integers, m≦M, and n≦N; and burst-transferring the data at the (K+m)th column of the Lth line and the data at the Kth column of the (L+n)th line in the burst mode by successively accessing the column address of the data at the (K+m)th column of the Lth line and the column address of the data at the Kth column of the (L+n)th line, wherein at least one area of said DRAM is a frame memory which stores image data and the rectangular area is M pixels×N lines in the image data, where M and N are positive integers, and a data processor performs motion compensation and motion estimation, where n=2n' and n' is a positive integer.

* * * * *